April 10, 1934. P. E. TAYLOR 1,954,153
ELECTRICAL TIRE PRESSURE INDICATOR
Filed May 5, 1932 2 Sheets-Sheet 1
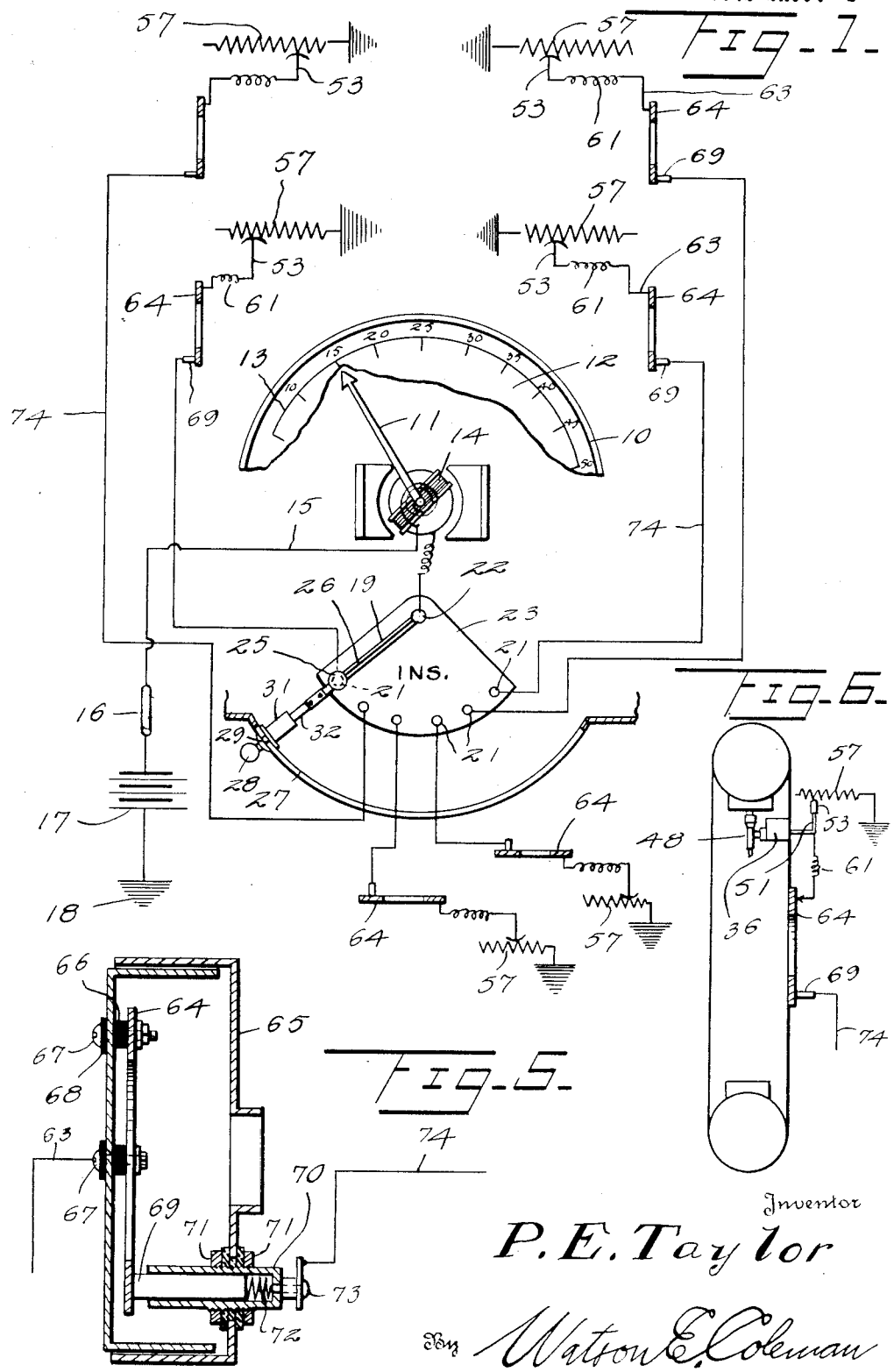

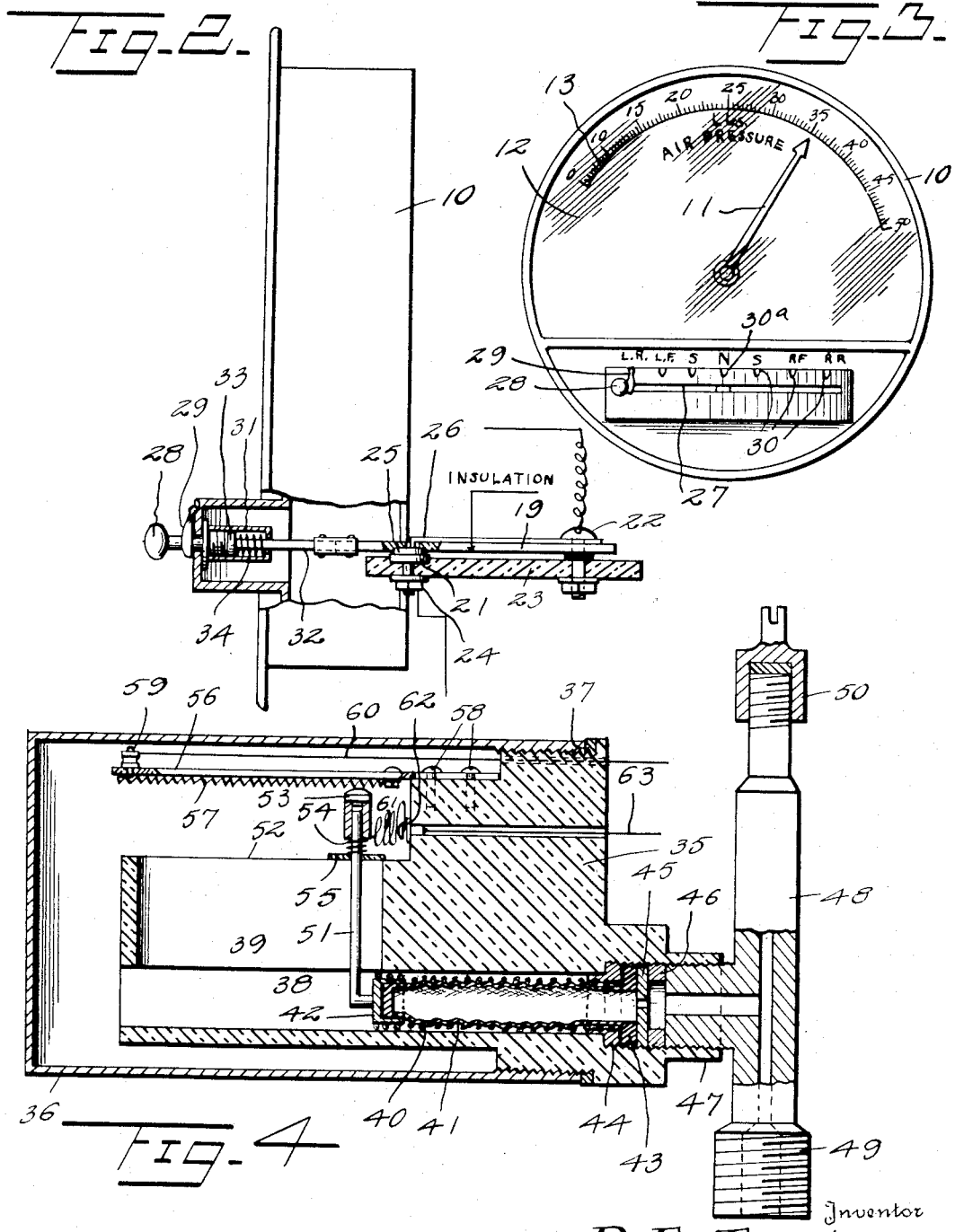

Patented Apr. 10, 1934

1,954,153

UNITED STATES PATENT OFFICE 1,954,153

ELECTRICAL TIRE PRESSURE INDICATOR

Paul E. Taylor, Memphis, Tenn.

Application May 5, 1932, Serial No. 609,474

1 Claim. (Cl. 201—62)

This invention relates to devices for indicating the air pressure on inflated pneumatic tires and particularly to electrically operated means for so doing. The general object of the invention is to provide means mounted upon a car and connected to an indicator on the dashboard of the car whereby the operator of the car may at any time note the air pressure on any of his tires, whether the tires are in actual use or spare tires and may note whether the pressure is above or below a predetermined pressure at which the tire is to be kept.

A further object is to provide means whereby the tire pressure operates to cut in or cut out resistance, this resistance being connected through a commutator mounted upon the wheel to an ammeter or equivalent device mounted upon the instrument board, this ammeter or other current measuring device being provided with a switch whereby it may be connected in circuit with a source of current and any one of the tires.

A further object is to provide improved means for this purpose which includes a rheostat, the movable contact of which is operatively connected to the interior of the tire through an air valve and which contact is therefore shifted over the rheostat contacts or resistance coil in accordance with the amount of pressure carried in the tire.

A further object is to provide a construction of this character which includes a brush and collector ring whereby current is taken from the wheel and includes an electric meter such as an ammeter or a meter operating on the same principle which is modified to provide a switch so that current may be sent from the ignition battery through the resistance and through the meter, the hand of the meter indicating not the amount of current to be sent therethrough, but indicating the amount of pressure carried by the tire.

Other objects will appear in the course of the following description.

My invention is illustrated in the accompanying drawings, wherein:—

Fig. 1 is a diagrammatic view of a tire testing system constructed in accordance with my invention;

Fig. 2 is an elevation of the current meter partly broken away and showing the switch and allied parts in section;

Fig. 3 is a front elevation of the meter;

Fig. 4 is a longitudinal sectional view of the pressure actuated rheostat and its connections;

Fig. 5 is a sectional view through an axially disposed wheel element showing the brush and collector ring thereon;

Fig. 6 is a diagrammatic view of the connections from the tire through the rheostat to the collector ring.

Referring to the diagrammatic view in Figure 1, 10 designates the current measuring device which may be of any suitable character and is shown as operating on the principle of the ammeter and carrying the pivoted hand 11 operating over the dial 12, this dial being provided with graduations running from naught to fifty or from naught to any other number, these graduations 13 indicating air pressure units. The central coil 14 of the ammeter is shown as being connected on one side to a conductor 15 leading to an ignition switch 16 in turn connected to a six or twelve volt battery 17, the other pole of which is connected to the ground 18 on the machine. The other end of the central coil 14 is connected to a switch arm 19 which is movable over a plurality of contacts shown as six in number and designated 21. These six contacts correspond to the four wheels of the vehicle and the two spare tires if the vehicle carries one or more spares. Inasmuch as the connections from each contact to each wheel are alike, I will only describe one of these connections.

The switch arm 19 is pivoted by means of the pivot 22 to the fibre base 23. This fibre base carries the series of contacts 21, each contact being held in place by the binding screw 24. The switch arm 19 carries upon it a contact 25 engageable with the contacts 21 and this contact 25 is electrically connected by a wire 26 to the pivot 22. This pivot in turn is connected through the coil 14 of the ammeter to the battery 17, as previously stated. The face of the meter 10 is provided with a slot 27 and operating over this slot is a knob or handle 28 formed with an upwardly extending finger 29 adapted to fit in any one of a series of grooves 30 so as to hold the fingers set in any desired position.

The shank of this handle or knob extends through the face plate of the dial and on its inside face carries a cylindrical hollow element 31. Connected to the switch arm 19 is a shank 32 which extends into this hollow element 31 and is formed at its end with a head 33. A spring 34 engages against the rear end of the hollow element 31 and urges this hollow element rearward, thus holding the finger 29 in engagement with any one of the grooves 30 heretofore referred to. When it is desired to move the switch arm, the operator retracts the knob 28 so as to disengage the finger from the groove, then shifts the switch arm to carry it to a new position, then releases the knob 28 when the finger is opposite one of the grooves 30 and the finger is then detachably locked in this position. The several grooves 30 correspond in position to the several contacts 21.

As illustrated, there is a contact 21 and a groove 30 for the left rear tire, the left front tire, the right front tire, the rear right tire and an extra left and extra right tire. There is also a groove 30a into which the finger 29 may be engaged when the switch arm has been shifted to a neutral position out of engagement with any of the contacts 21. These several notches or grooves 30 are indicated on the dial by the letters L. F., L. R., R. F., R. R., etc.

Mounted in connection with each tire, as for instance upon the rim of the tire, is a rheostat, as shown generally in Figure 4. This comprises a base 35 of nonconductive material and over which fits a cap or cylindrical cover 36 which may be made of thin aluminum or other thin and light metal, which cap has screw-threaded engagement with the base 35 and preferably bears against a gasket 37 so that the parts then are prevented from collecting dust.

The base 35 is formed with a longitudinally extending bore or tubular portion 38 and with a longitudinally extending slot 39 intersecting this tubular bore 38. Disposed within the rear end of the bore 38 rearward of this slot 39 is a coiled contractile spring 40. This spring at one end is threadedly engaged with a cap 42 and at its other end is threadedly engaged with an exteriorly screw-threaded collar 43. Within this spring is a thin rubber tube 41 longitudinally expansible under air pressure and formed at its rear end with a head 43 held in place against the collar 44 as shown in Figure 4 by means of a perforated septum 45 and a screw-threaded collar 46. Thus the head of the rubber tube is clamped into place.

Operatively connected to the bore through the coupling 47 is a T-shaped element 48 formed at its end 49 with means whereby it may be screwed to the tire valve of the car itself to operate on, the exterior of this portion 49 being threaded, these threads being the same size and number as the standard tire valve threads. The opposite end of the member 48 is reduced in diameter to provide an air valve the same size as that on any automobile tire which is normally closed by a cap 50. It will be understood, of course, that this end of the member 48 may carry any usual inlet valve such as a Shrader valve or the like permitting the injection of air, but preventing its leaking out. Inasmuch as these air valves are well-known, I have not described this construction.

It will be seen now that the pressure of air within the tire will act upon the thin rubber tube 41 to longitudinally expand it against the action of the spring 40 and that when there is no pressure within the tire or a pressure below the normal pressure, the spring will cause the contraction of the rubber tube 41.

Attached to the cap 42 is an angular finger 51 which travels within the slot 39 and which extends out on the face 52 of the base 35. Mounted upon the extremity of this finger is a metallic contact 53 which is urged upward by means of a spring 54 bearing against a metal plate 55 in turn bearing against the face 52. Also mounted upon the base 35 and extending parallel to the face 52 is a supporting plate or strip 56 of insulating material such as hard fibre and mounted upon the face of this insulated support is a resistance coil 57 over which the contact 53 travels, the contact being held in proper engagement with the resistance coil by means of the spring 54 as previously stated. The support 56 is longitudinally slotted at one end and held upon the base 35 by means of a screw or screws 58 passing through this slot so that this support may be adjusted and then clamped in adjusted position. The extremity of the support 56 carries upon it the binding screw 59 which is electrically connected to the coil 57 and from which a wire 60 leads through the base 35 and to the battery through the frame of the car as will be later stated. The contact 53 is connected by a slack wire 61 and binding screw 52 from which a wire 63 extends to a collector ring.

The collector ring 64 is supported on the wheel, brake drum or gear housing which is designated generally 65 and is illustrated diagrammatically. The ring 64 should be made of aluminum, brass, copper or bronze, and, of course, will be of suitable size to fit the type of car upon which it will be mounted. It is, of course, to be insulated from the drum and yet mounted thereon and to this end I have shown the insulating or fibre supports 66 through which pass the screws 67 which are thus insulated entirely from the drum 65. Fibre washers 68 are disposed between the heads of these screws and the housing or drum 65. One of these screws 67 constitutes a binding screw and to it the wire 63 is connected, this wire 63, of course, leading to the contact 53 previously described.

Coacting with the ring 64 is a brush 69 which may consist of laminated copper, bronze, brass, etc., and which is mounted in a three-eighths of an inch fibre round tube 70, this tube being held in place upon the wall of the drum by the lock nuts 71 so that the brush bears against the collector ring 64. A spring 72 bears against the rear end of the brush and urges it outward against the face of the collector ring. Grease, wax or other soft lubricant or lubricating composition surrounds the brush so as to prevent cutting of the ring. Electrically connected to the rear of the brush is a binding screw 73 from which a wire 74 leads to one of the contacts 21 on the meter.

It will be obvious now that when the arm 19 of the switch is turned so that the contact 25 carried thereby will engage one of the contacts 21 that, assuming that the ignition switch is closed, a circuit will be completed from the battery 17 through the coil of the meter through the switch arm and thence by wire 74 to the brush, thence to the collector ring 64 from the ring by wire 63 to the contact 56, thence through the resistance coils of the rheostat to the grounded wire 60 and thence back through the frame of the machine to the grounded terminal of the battery 17. It will also be obvious that the amount of current passing through the meter and, therefore, the position of the indicating hand or pointer will be determined by the amount of resistance which has been cut in and that this in turn is determined by the degree of inflation of the particular tire being tested. It will further be obvious that by turning the switch arm to bring its contact 25 into engagement with one or another of the contacts 21, any one of the several tires on the wheels in actual use may be tested or that the inflation of the spare tires may be tested and that this test may be conducted while the machine is traveling as well as when the machine is still. Thus this air pressure testing device will, when properly installed, show when the tires need air or if they have too much air. Thus when the car is being serviced, there is no necessity of getting out of the car in order to test the tires and be able to tell the garage employee whether he has put too much air into the tires or reduced the air in the tires. This makes it particularly handy to a women driver or to one who does not wish to get soiled in servicing his own tires.

This test is readily made when the ignition switch is cut in and when the test is over the connection through the testing mechanism is cut out so that no current is wasted or battery run down. Preferably the graduations on the dial will be arranged to conform with the required pressures of the tire that this gage is to be operated with. The meter should be as small as possible and should range in ohms resistance between 30 and 35 ohms. Preferably it is a D. C. meter of the electro-magnetic type. It will be seen that the resistance element is adjustable by means of the screw or screws 58 so that the resistance element may be synchronized with the tire pressure and the meter reading on the dash to correspond with the adjustment made or required.

While I have illustrated the switch as being mounted upon the meter itself, it is to be understood that it may be mounted separately from the meter. The system with a single meter can also be installed on a trailer so that the tire pressure on the trailer can also be read from the meter on the front truck dash board. With this construction the meter hand or pointer will automatically adjust itself to the proper reading when the resistance unit is adjusted to the proper tire pressure, one adjustment being all that is required. After once the true adjustment has been made, no further adjustment need be made. It will be understood further that there can be a separate meter for each tire or that there can be one meter for all the tires and I do not wish to be limited therefore to the use of a single meter for all the tires.

I claim:—

An air pressure rheostat engaging the air pressure in tires comprising a cylindrical body of insulating material having a flange at its base and being screw-threaded beyond said flange, the body having a longitudinally extending bore counter-bored at one end of the body, this counter-bored of the body projecting outward to form a coupling, a T-shaped air terminal having a radially extending branch intermediate its ends and having screw-threaded engagement with said coupling portion of the body, a tubular elastic longitudinally extensible member disposed within said bore and closed at its inner end but open at its outer end and having an annular head adapted to be disposed and seated within the counter-bored portion of the bore, the air terminal operatively holding the head in place, the inner end of the extensible member having a finger, the body being formed with a longitudinally extending slot to receive said finger and guide it, the body above said finger being recessed, a resistance element support mounted in said recess and extending longitudinally of the body in alinement with the slot therein, a resistance element carried thereby, electrical connections extending from said resistance element and from said contact outward through the base of the body and having a cylindrical housing having screw-threads at its open end adapted to engage the screw-threads of the base, the housing surrounding and enclosing the resistance element, the contact and the slotted portion of the body.

PAUL E. TAYLOR.